United States Patent
Desai et al.

(10) Patent No.: US 9,058,174 B2
(45) Date of Patent: Jun. 16, 2015

(54) WIRING WEB WIDGETS OF A WEB MASHUP

(75) Inventors: Nirmit V. Desai, Bangalore (IN); Richa Gupta, Kanpur (IN); Pawan Kumar, Lucknow (IN); Shruti P. Kumar, Pondicherry (IN); Madhusudhan R. Ramidi, Bangalore (IN); Virendra K. Varshneya, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 760 days.

(21) Appl. No.: 12/906,345

(22) Filed: Oct. 18, 2010

(65) Prior Publication Data

US 2012/0096429 A1      Apr. 19, 2012

(51) Int. Cl.
*G06F 9/44*   (2006.01)
(52) U.S. Cl.
CPC ........................................ *G06F 8/34* (2013.01)
(58) Field of Classification Search
USPC ................................................ 717/107, 100
See application file for complete search history.

(56) References Cited

U.S. PATENT DOCUMENTS

| | | | |
|---|---|---|---|
| 7,340,684 B2* | 3/2008 | Ramamoorthy et al. | 715/763 |
| 8,104,044 B1* | 1/2012 | Scofield et al. | 719/313 |
| 2007/0101291 A1 | 5/2007 | Forstall et al. | |
| 2009/0064183 A1 | 3/2009 | Chijiiwa et al. | |
| 2009/0070409 A1* | 3/2009 | Clayton et al. | 709/203 |
| 2009/0157728 A1 | 6/2009 | Fletcher et al. | |
| 2009/0210481 A1* | 8/2009 | Fletcher et al. | 709/203 |
| 2009/0249359 A1 | 10/2009 | Caunter et al. | |
| 2009/0313601 A1* | 12/2009 | Baird et al. | 717/106 |
| 2010/0023690 A1 | 1/2010 | Dewar et al. | |
| 2010/0023874 A1 | 1/2010 | Frohwein | |
| 2010/0037157 A1* | 2/2010 | Chang et al. | 715/764 |
| 2010/0153865 A1* | 6/2010 | Barnes et al. | 715/762 |
| 2011/0055741 A1* | 3/2011 | Jeon et al. | 715/765 |

* cited by examiner

*Primary Examiner* — Hang Pan
(74) *Attorney, Agent, or Firm* — Patterson & Sheridan, LLP

(57) ABSTRACT

For wiring web widgets of a web mashup application, a web widget registry may be generated based on one or more properties of the web widgets of the web mashup application. Based on the web widget registry, the web widgets of the web mashup application may be wired together, without requiring input from a user. Cycles among the web widgets may also be detected and removed.

24 Claims, 14 Drawing Sheets

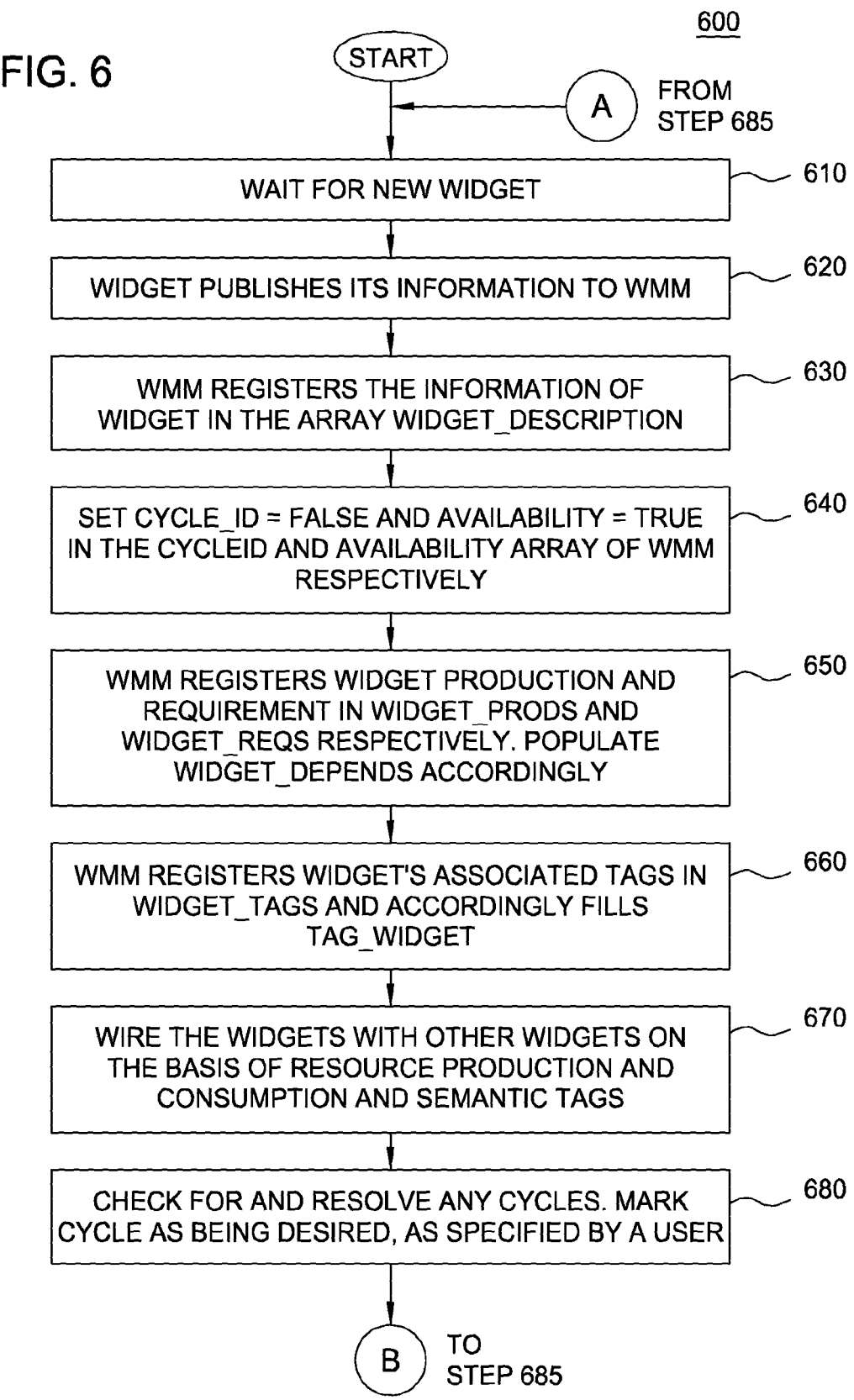

Widget Viewer Registry Entry (802)

| Field | Value |
|---|---|
| WIDGET ID | ID 1 |
| PRODUCTION | NONE |
| CONSUMPTION | DOCS |
| TAGS | PDF, XML |
| SEMANTIC WEB ID (LIKE OWL TREE ID) | WEBID1 |
| AVAILABILITY | TRUE |
| CYCLE ID | TRUE |
| WIDGET WIRED WITH | ID2, ID3 |

(804)

Widget Attachment Registry Entry (806)

| Field | Value |
|---|---|
| WIDGET ID | ID 2 |
| PRODUCTION | DOCS |
| CONSUMPTION | NONE |
| TAGS | PDF, XML |
| SEMANTIC WEB ID (LIKE OWL TREE ID) | WEBID2 |
| AVAILABILITY | FALSE |
| CYCLE ID | TRUE |
| WIDGET WIRED WITH | ID1 |

(808)

Widget Timestamp Registry Entry (810)

| Field | Value |
|---|---|
| WIDGET ID | ID 3 |
| PRODUCTION | TIMESTAMP |
| CONSUMPTION | NONE |
| TAGS | PDF, XML |
| SEMANTIC WEB ID (LIKE OWL TREE ID) | WEBID3 |
| AVAILABILITY | TRUE |
| CYCLE ID | TRUE |
| WIDGET WIRED WITH | ID1 |

(812)

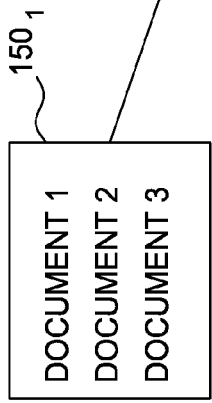
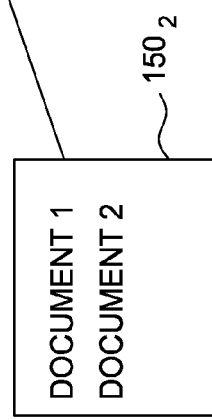
FIG. 13

WIRING WEB WIDGETS OF A WEB MASHUP

BACKGROUND

Web mashups have become increasingly popular on the World Wide Web. A web mashup refers to a web application that combines content from multiple sources. A web mashup may include or provide, but does not necessarily include or provide, the following features. A web mashup typically includes web widgets that each retrieves, processes, and presents content from a respective source. Each web widget may communicate with the respective source via an application programming interface (API) specified by the respective source. Further, the web widgets may also interact with one another to retrieve and/or present the content.

Web mashups represent a powerful paradigm of web development, permitting a user having minimal knowledge of software development to rapidly create customized web applications using existing sources of content. A user may create a new web mashup by placing one or more web widgets within a blank design canvas representing the web mashup. The user may then save the web mashup and publish the web mashup to a server for other users to access.

SUMMARY

Embodiments of the invention provide a computer-implemented method, computer program product, and system for performing an operation that includes selecting, based on user input, a plurality of web widgets for inclusion in a mashup web application to be accessed by a first computer, wherein each of the plurality of web widgets comprises an embeddable web application that retrieves data from a respective computer other than the first computer. The operation also includes generating a web widget registry based on one or more properties of the selected plurality of web widgets. The operation also includes wiring the plurality of web widgets, based on the web widget registry.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIG. 8 illustrates web widget registry entries for the web widgets of the web mashup, according to one embodiment of the invention.

FIG. 13 illustrates the web mashup in which multiple web widgets for uploading files are wired to a single web widget for viewing uploaded files, according to one embodiment of the invention.

DETAILED DESCRIPTION

Figure 1:
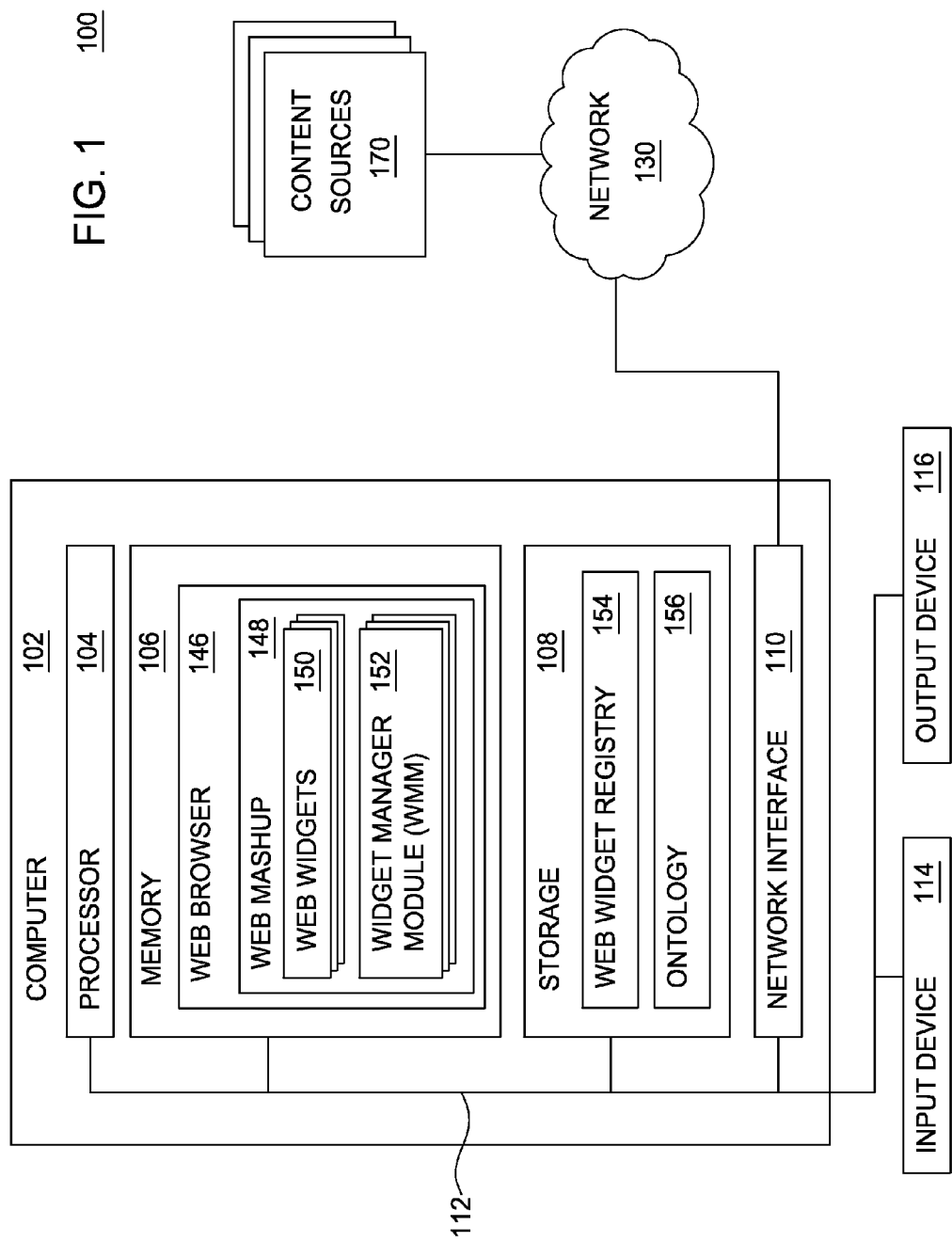
FIG. 1 is a block diagram illustrating a system for wiring web widgets of a web mashup, according to one embodiment of the invention.

Embodiments of the present invention generally provide techniques for wiring web widgets of a web mashup. One embodiment of the invention provides a widget manager module (WMM). The WMM generates a web widget registry based on a plurality of web widgets in a web mashup. The web widget registry describes resources consumed and/or produced by each web widget and semantic tags associated with the respective web widget. Based on the web widget registry, the WMM wires the web widgets together without requiring any input from a user. The WMM also detects and removes cycles among the web widgets and provides an interface for the web widgets to communicate with one another. Further, as the user adds/removes web widgets to/from the web mashup, the WMM resolves dependencies among the web widgets. The WMM also allows the user to manually include or exclude one or more wirings between the web widgets. Advantageously, web widgets may be wired together more accurately and/or efficiently. Accordingly, a user may create web mashups more conveniently and/or efficiently.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 is a block diagram illustrating a system 100 for wiring web widgets of a web mashup, according to one embodiment of the invention. The networked system 100 includes a computer 102 that is connected to one or more content sources 170 via the network 130. Each content source 170 exposes content to applications executing on the computer 102 and via one or more application programming interfaces (APIs). The computer 102 may also be connected to other computers via the network 130. In general, the network 130 may be a telecommunications network and/or a wide area network (WAN). In a particular embodiment, the network 130 is the Internet.

The computer 102 generally includes a processor 104 connected via a bus 112 to a memory 106, a network interface device 110, a storage 108, an input device 114, and an output device 116. The computer 102 is generally under the control of an operating system 146. Examples of operating systems include UNIX, versions of the Microsoft Windows® operating system, and distributions of the Linux® operating system. More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single identity, it should be understood that the memory 106 may comprise a plurality of modules, and that the memory 106 may exist at multiple levels, from high speed registers and caches to lower speed but larger DRAM chips. The network interface device 110 may be any type of network communications device allowing the computer 102 to communicate with other computers via the network 130.

The storage 108 may be a persistent storage device. Although the storage 108 is shown as a single unit, the storage 108 may be a combination of fixed and/or removable storage devices, such as fixed disc drives, floppy disc drives, tape drives, removable memory cards, or optical storage. The memory 106 and the storage 108 may be part of one virtual address space spanning multiple primary and secondary storage devices.

The input device 114 may be any device for providing input to the computer 102. For example, a keyboard, keypad, light pen, touch-screen, track-ball, or speech recognition unit, audio/video player, and the like may be used. The output device 116 may be any device for providing output to a user of the computer 102. For example, the output device 116 may be any conventional display screen or set of speakers, along with their respective interface cards, i.e., video cards and sound cards (not shown). Although shown separately from the input device 114, the output device 116 and input device 114 may be combined. For example, a display screen with an integrated touch-screen, a display with an integrated keyboard, or a speech recognition unit combined with a text speech converter may be used.

As shown, the memory 106 of the computer 102 includes a web browser 146. The web browser 146 refers to an application for accessing a plurality of interlinked hypertext documents over a network. Each hypertext document is identified by a Uniform Resource Identifier (URI) and may be a web page, a web application (e.g., a web mashup 148), a graphical image, text, audio, video, etc. The hypertext documents may be interlinked using hyperlinks. A user of the web browser 146 may navigate from information resource to information resource by activating the hyperlinks via a graphical user interface (GUI) of the web browser 146. The user of the web browser may also access a web application for creating and/or modifying one or more web mashups. The web application includes a palette of web widgets that may be added to a web mashup. The web application also includes one or more graphical user interface (GUI) screens for adding wiring between the web widgets. Examples of the web application include IBM® Lotus® Mashups, Yahoo® Pipes™, and Microsoft® Popfly™.

In one embodiment, the web mashup 148 (or mashup web application) is a web application that combines content from multiple content sources 170. The web mashup 148 includes a plurality of web widgets 150 that each retrieves, processes, and presents content from a respective source, using an application programming interface (API) specified by the respective source. The APIs exposed to the web widgets 150 for retrieving content may be web services. As used herein, web services refer to APIs that are accessed via Hypertext Transfer Protocol (HTTP) and executed on a remote system hosting the web services. Further, each web service adheres to one or more predefined web service protocols. The web mashup 148 further includes a widget manager module (WMM) 152. As further described below, the WMM 152 wires together the web widgets 150 without requiring any input from a user creating and/or using the web mashup 148, thereby configuring the web widgets 150 to communicate with one another to provide functionality for the web mashup 148.

As shown, the storage 108 of the computer 102 includes a web widget registry 154 and an ontology 156. In one embodiment, in order to wires together the web widgets 150 without requiring any input from the user, the WMM 152 first generates the web widget registry 154 using information published by the web widgets 150. For each web widget 150, the web widget registry 154 stores a description of the respective web widget 150, a resource produced and/or consumed by the respective web widget 150, and one or more semantic tags associated with the respective web widget 150. Each semantic tag characterizes a resource produced or consumed and may be selected from a predefined ontology 156 of semantic tags. During the wiring process, the WMM 152 uses at least the semantic tags to determine which resources (of distinct web widgets) are compatible with one another.

In one embodiment, upon being added to the web mashup 148, each web widget 150 publishes information to the WMM 152 for inclusion in the web widget registry 154. The information may be represented by a widget publication object and may describe one or more properties of the respective web widget 150. An exemplary class definition for the widget publication object is shown below.

TABLE I

Exemplary class definition for the widget publication object

```
class Widget_publications
{
    Widget_description;
    res_prod_cons;
    Widget_reqs;
    Widget_prods;
    Widget_tag;
    Boolean cycle_id;
    Boolean availability;
    Hierarchy_id;
}
```

In one embodiment, Widget_description stores information identifying a web widget (e.g., identifier, name, etc.). res_prod_cons stores all resources known to the WMM 152. Depending on the embodiment, res_prod_cons may also store, for each resource, a first set of web widgets producing the respective resource and a second set of web widgets consuming the respective resource. Widget_reqs stores resources consumed by a specific web widget. Widget_prods stores resources produced by the specific web widget. Widget_tag stores semantic tags associated with the specific web widget. cycle_id is a flag that specifies whether cycles have been resolved for the specific web widget.

In one embodiment, a cycle refers to associations between two or more web widgets, where the associations form a cycle. Depending on the embodiment, cycles include only directed cycles among web widgets. Where producer-consumer relationships are represented as arrows originating at a producer and pointing to a consumer, directed cycles refer to associations between web widgets, where the arrows point in a single direction (either clockwise or counterclockwise, but not both). Further, depending on the embodiment, cycle_id is set to false by default (e.g., when a web widget is first added to the web mashup 148). The boolean availability is a flag that specifies whether the web widget is set to active. Hierarchy_id stores an identifier to an ontology associated with the web widget.

As described above, in one embodiment, the class definition for the widget publication object includes a Widget_description object. An exemplary class definition for the Widget_description object is shown below.

TABLE II

Exemplary class definition for the widget description object

```
class Widget_description
{
    String ID;
    String TYPE;
    Object object;
}
```

In one embodiment, ID stores an identifier that uniquely identifies the web widget. TYPE stores a type of the web widget. The Object, object, stores a pointer to an instance of the web widget.

As described above, in one embodiment, the class definition for the widget publication object also includes a res_prod_cons object. An exemplary class definition for the res_prod_cons object is shown below.

TABLE III

Exemplary class definition for the widget resources object

```
class res_prod_cons
{
    String Res_Type;
    Set Widget_producing;
    Set Widget_consuming;
}
```

In one embodiment, Res_Type stores a type of a specific resource. Widget_producing stores a set of widgets producing the type of the resource, as specified by Res_Type. Widget_consuming stores a set of widgets consuming the type of the resource, as specified by Res_Type. For example, assume that a first web widget for uploading files produces a resource that includes a file stored in Portable Document Format (PDF). A second web widget for viewing the PDF file consumes the resource produced by the first web widget. A third web widget for saving a timestamp associated with the PDF file also consumes the resource produced by the first web widget. In this particular example, Res_Type is "PDF", Widget_producing stores the first web widget, and Widget_consuming stores the second and third web widgets.

As described above, in one embodiment, the class definition for the widget publication object also includes a Widget_tag object. An exemplary class definition for the Widget_tag object is shown below.

TABLE IV

Exemplary class definition for the widget tag object

```
class Widget_tag
{
    String ID;
    String TYPE;
    Array tags;
}
```

In the Widget_tag class, ID stores an identifier that uniquely identifies the web widget, while TYPE stores a type of the web widget. The tags array stores a list of tags associated with the web widget. For example, the web widget for uploading files may be associated with the tags "PDF" and "XML" if the web widget allows uploading documents in PDF or Extensible Markup Language (XML) formats.

As described above, the widget tag object stores one or more tags associated with a given web widget. In other words, the widget tag object stores a mapping from a web widget to one or more tags. In one embodiment, the WMM 152 also stores a reverse mapping—i.e., from a tag to one or more web widgets. The reverse mapping may be represented by a tag_Widget object. An exemplary class definition for the tag_Widget object is shown below.

TABLE V

Exemplary class definition for the tag widget object

```
class tag_Widget
{
    String tag;
    Array Widget_description;
}
```

In one embodiment, the string tag stores a given tag that is associated with one or more web widgets. Widget_description stores information identifying the one or more web widgets associated with the given tag. For example, the second web widget for viewing the PDF and the third web widget for saving a timestamp associated with the PDF file may both be associated with a tag of "PDF".

In one embodiment, upon receiving each widget publication object, the WMM 152 identifies dependencies between the web widgets 150, based on the information published by the web widgets 150. A dependency refers to an association between a first web widget that produces a given resource and a second web widget that consumes the given resource. The dependency may be represented by a Widget_depends object. An exemplary class definition for the Widget_depends object is shown below.

TABLE VI

Exemplary class definition for the widget dependency object

```
class Widget_depends
{
    String ID;
    String TYPE;
    Array Widget_description;
}
```

In the Widget_depends class, ID stores an identifier that uniquely identifies the web widget, while TYPE stores a type of the web widget. Widget_description stores a list of web widgets that consume one or more resources produced by the web widget.

In one embodiment, the WMM 152 may be represented by a WMM object. An exemplary class definition for the WMM object is shown below.

TABLE VII

Exemplary class definition for the WMM object

```
class Widget_Module_Manager
{
    Array Widget_description;
    Array res_prod_cons;
    Array Widget_reqs;
    Array Widget_prods;
    Array Widget_depends;
    Array Widget_tag;
    Array tag_Widget;
    Array cycle_id;
    Array availability;
    Array hierarchy_id;
}
```

In one embodiment, the WMM object stores an array for each member variable of the widget publication object (described above). The array for the respective member variable allows the WMM object to store values for multiple web widgets. Further, the WMM object may also store arrays of tag_Widget and Widget_depends objects, both of which are described above.

Figure 2:
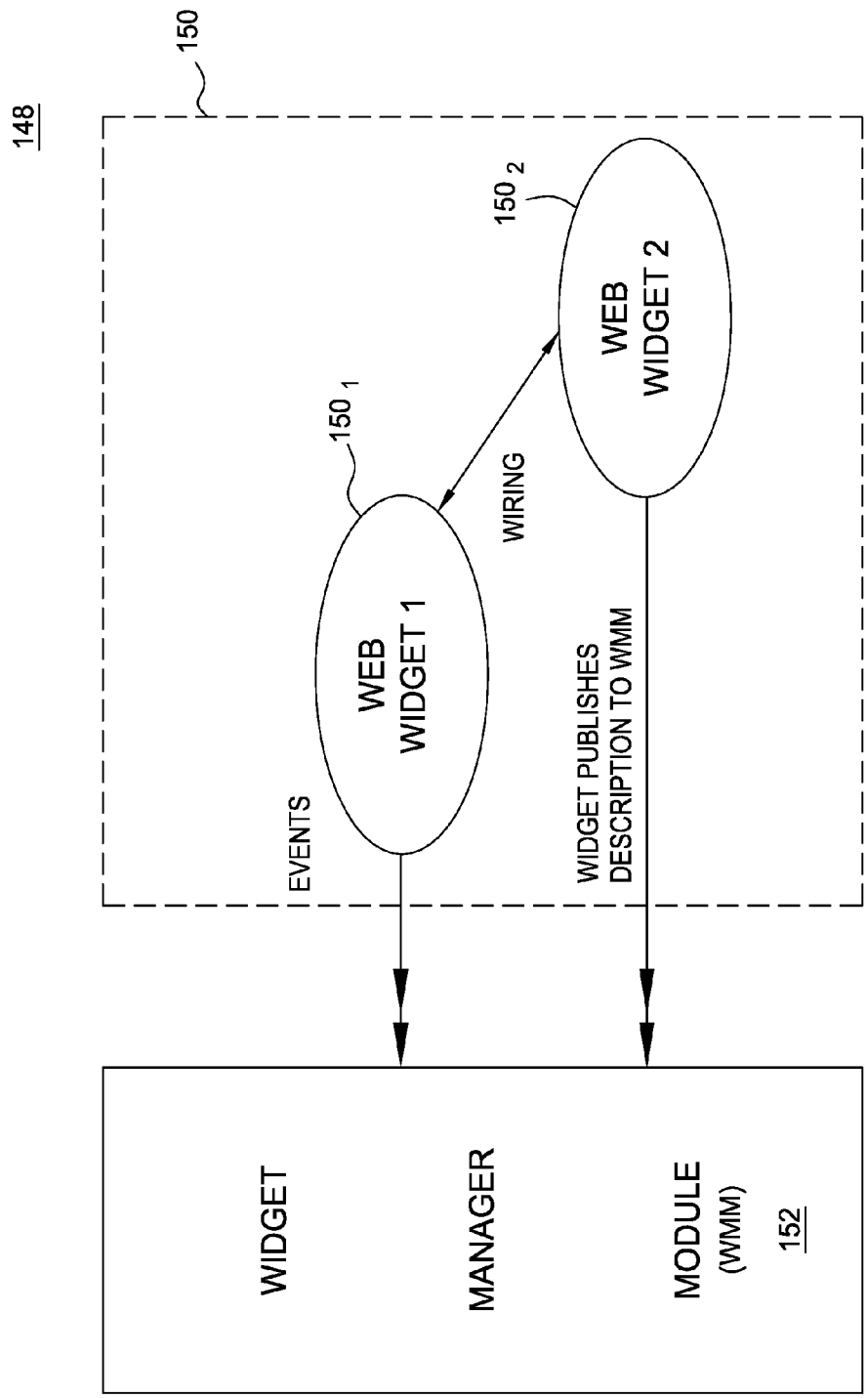
FIG. 2 illustrates the web mashup, according to one embodiment of the invention.

FIG. 2 illustrates the web mashup 148 of FIG. 1, according to one embodiment of the invention. As shown, the web mashup 148 includes the WMM 152 and the web widgets 150. The web widgets 150 include a first web widget $150_1$ wired to a second web widget $150_2$. As described above, the web widgets 150 publish information to the WMM 152 according to a predefined format, such as XML or JavaScript Object Notation (JSON). The WMM 152 acts as an interface between the web widgets 150 and monitors communications between the web widgets 150. The web widgets 150 may communicate with one another via one or more predefined events. For example, a source web widget may trigger an event that sends a message (such as a text string) to a target web widget, which handles the event and processes and/or outputs the message.

Figure 3:
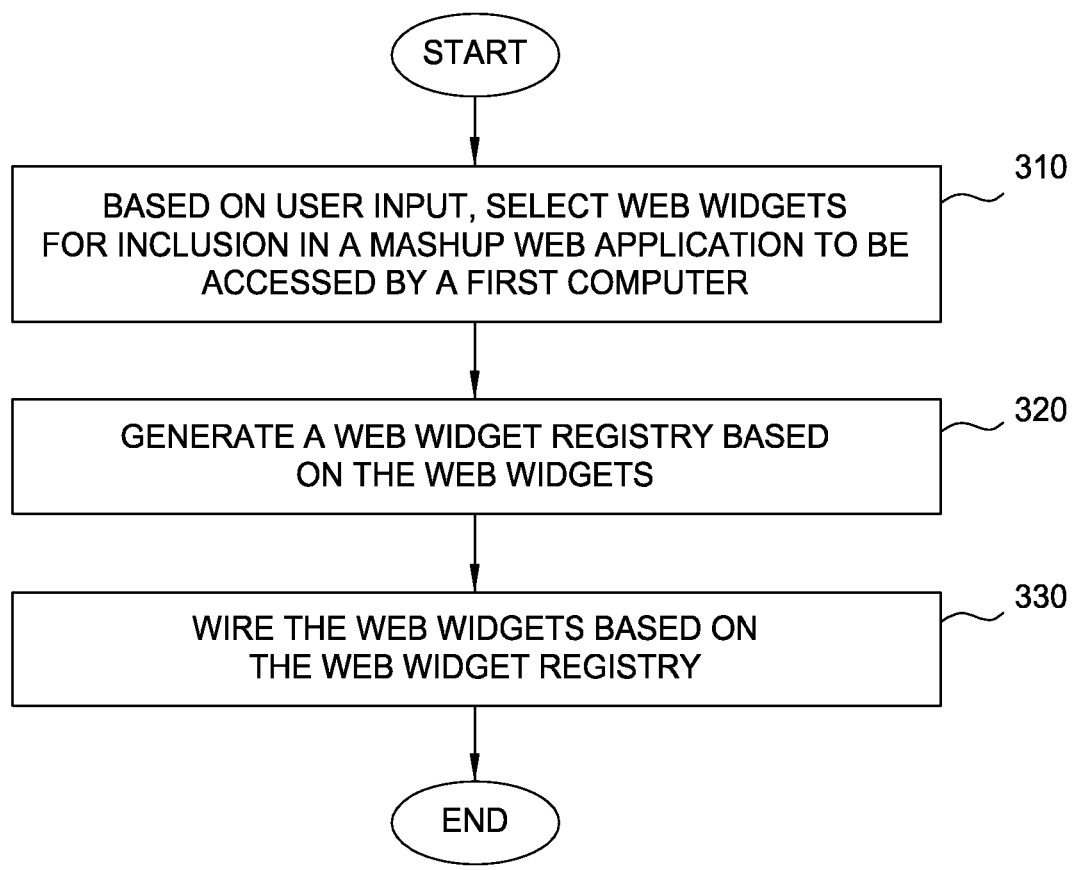
FIG. 3 is a flowchart depicting a method for generating the web mashup, according to one embodiment of the invention.

FIG. 3 is a flowchart depicting a method 300 for generating the web mashup 148 of FIG. 1, according to one embodiment of the invention. As shown, the method 300 begins at step 310, where the WMM 152 selects web widgets 150 for inclusion in the web mashup 148 to be accessed by a first computer. The web widgets 150 may be selected based on user input. At step 320, the WMM 152 generates the web widget registry 154 based on the selected web widgets 150. As described above, the web widget registry 154 stores, for each web widget: a description, a list of resources produced and/or consumed, and one or more semantic tags. At step 330, the WMM 152 wires the web widgets 150 based on the web widget registry 154. Specifically, the WMM 152 generates a plurality of wirings, each wiring representing an association between a web widget producing a resource and a web widget consuming the resource. After step 330, the method 300 terminates. Additional aspects of generating web mashups 148 are described below in conjunction with FIGS. 4-7.

Figure 4:
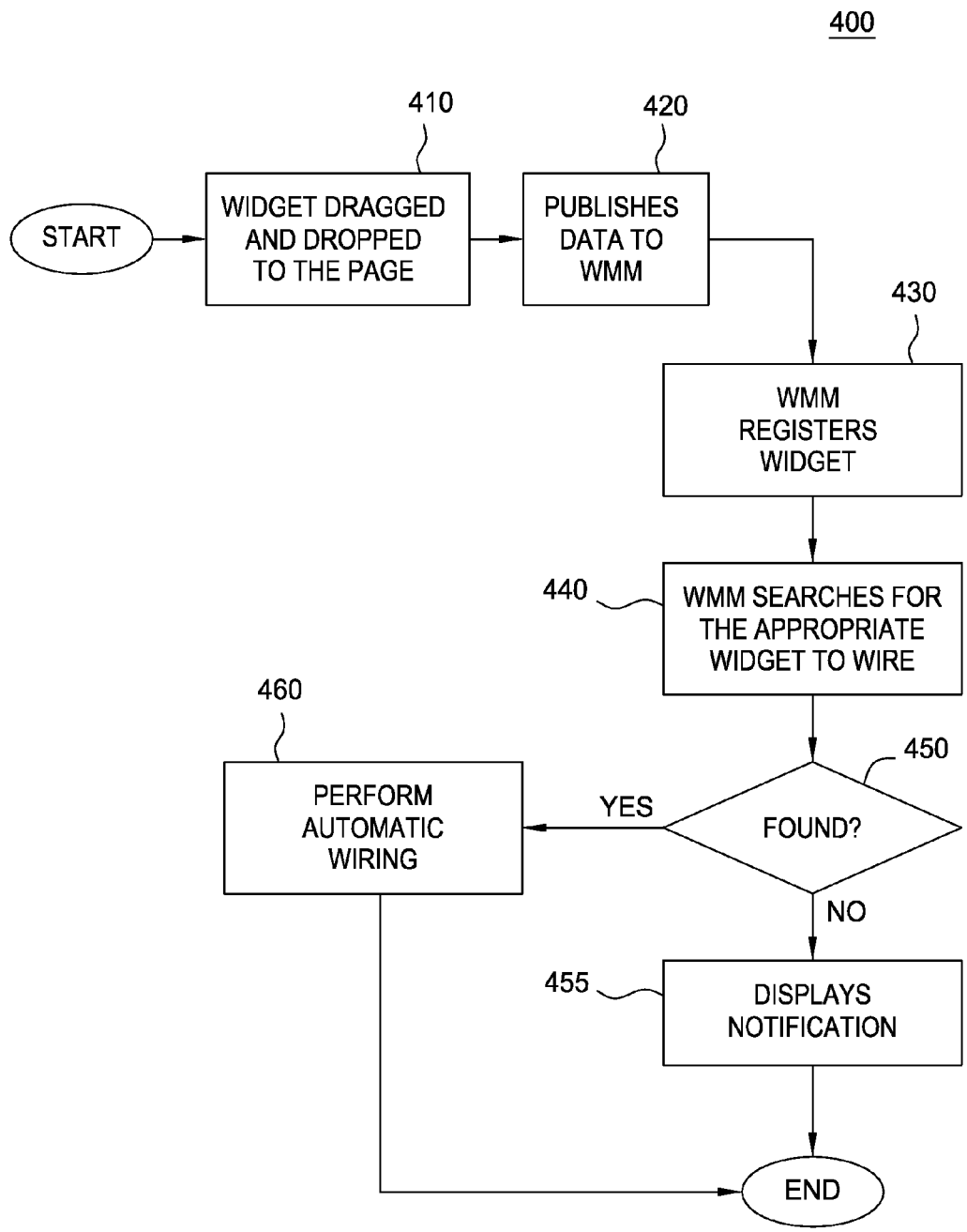
FIG. 4 is a flowchart depicting a method for adding a web widget to a web mashup, according to one embodiment of the invention.

FIG. 4 is a flowchart depicting a method 400 for adding a web widget 150 to a web mashup 148, according to one embodiment of the invention. As shown, the method 400 begins at step 410, where a user specifies to add a web widget 150 to the web mashup 148. For example, a user may use a pointing device to drag and drop a web widget from a predefined palette of available web widgets onto a design canvas representing the web mashup 148. At step 420, the web widget 150 publishes information to the WMM 152. As described above, the published information may include a description of the web widget, an identifier for the web widget, resources consumed and/or produced by the web widget, etc. At step 430, the WMM 152 stores the published information into the web widget registry 154.

At step 440, the WMM 152 determines whether a suitable match exists (among the web widgets already added to the web mashup 148). The suitable match refers to any web widget that can be wired to the web widget currently being added to the web mashup 148. In other words, the suitable match refers to any web widget that either produces a resource that is compatible with a resource consumed by the web widget being added—or consumes a resource that is compatible with a resource produced by the web widget being added. If the WMM 152 identifies a suitable match (step 450), the WMM 152 wires the suitable match to the web widget being added, without requiring any input from the user (step 460). Otherwise, the WMM 152 outputs a notification that no match was found (step 455). After the steps 455 or 460, the method 400 terminates.

Figure 5:
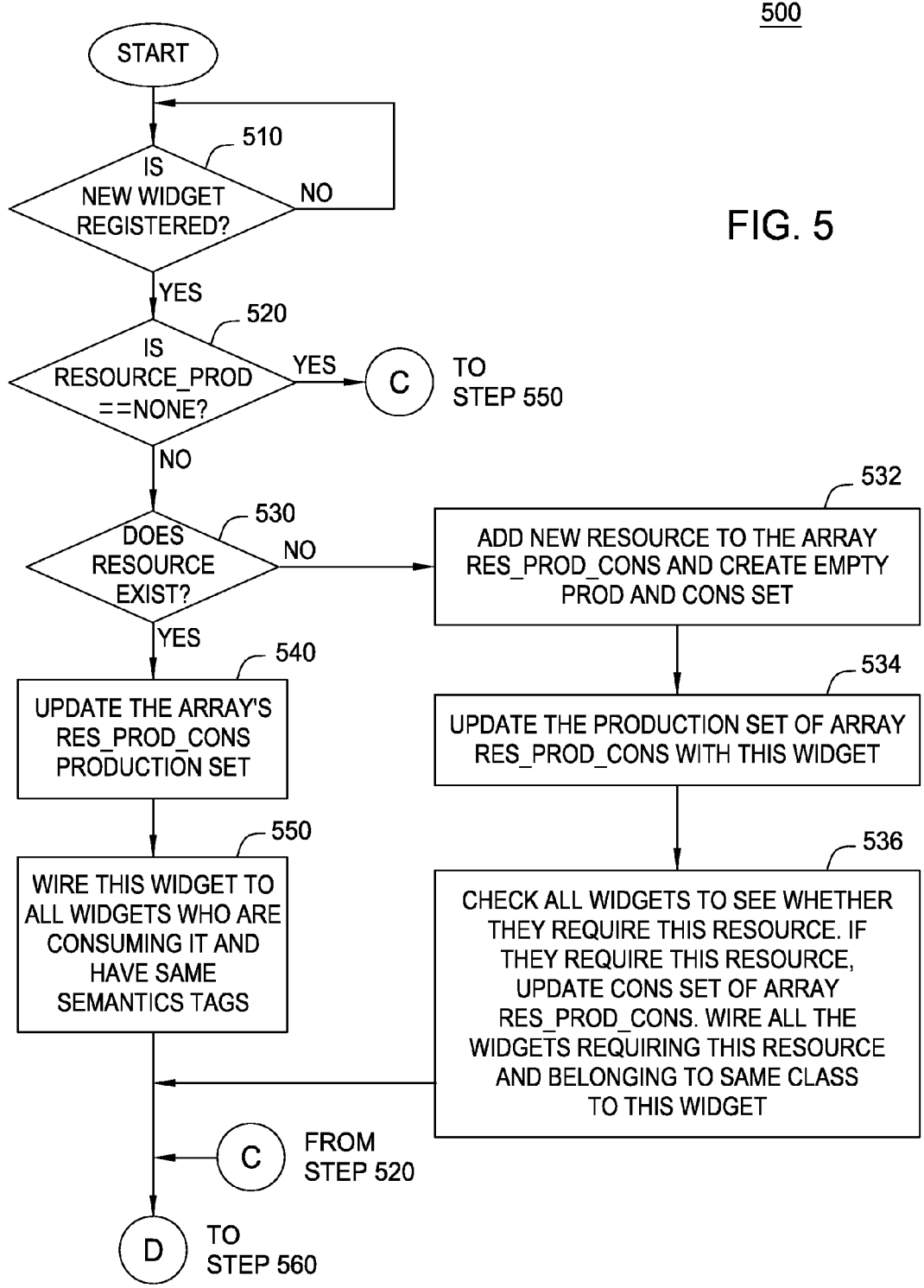
FIG. 5 is a flowchart depicting a method for wiring a web widget being added to the web mashup, according to one embodiment of the invention.
Figure 5:
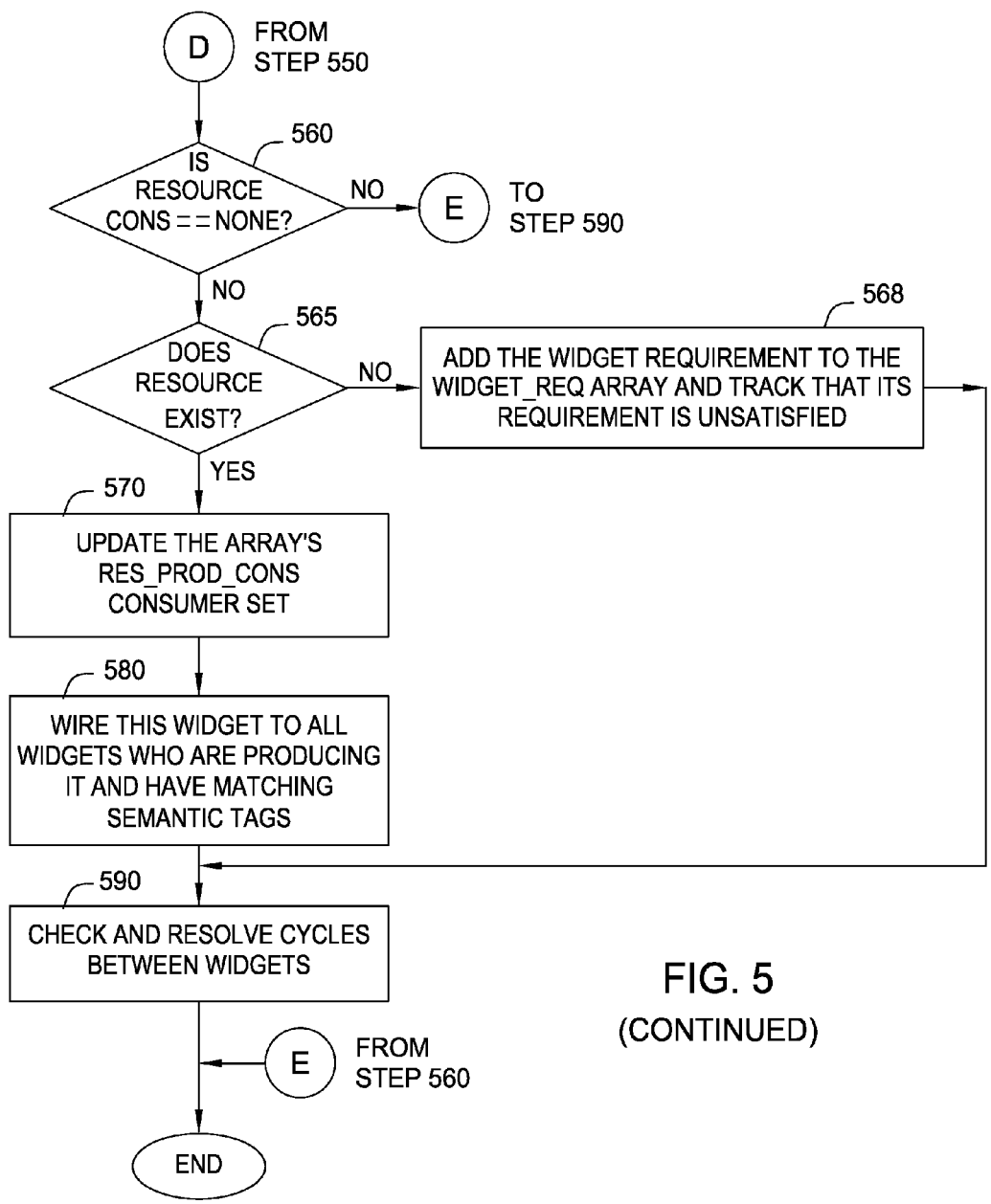

FIG. 5 is a flowchart depicting a method 500 for wiring a web widget being added to the web mashup 148 of FIG. 1, according to one embodiment of the invention. As shown, the method 500 begins at step 510, where the WMM 152 determines whether the new web widget (i.e., the web widget being added) is registered—i.e., whether the web widget registry 154 includes information pertaining to the new web widget. If not, the method 500 waits for a predetermined period of time before repeating the step 510. Otherwise, at step 520, the WMM 152 determines whether the new web widget produces any resources. If the new web widget does not produce any resources, the method 500 proceeds to the step 560, where the WMM 152 determines whether the new web widget consumes any resources. If the new web widget does not consume any resources, the method 500 terminates.

At step 530, the WMM 152 determines whether the resource produced by the new web widget is known to the WMM 152 for the web mashup 148. To this end, the WMM 152 may determine whether the res_prod_cons array includes the resource. If the produced resource is known to the WMM 152, the WMM 152 updates the res_prod_cons array to include the new web widget as a producer of the resource (step 540). The WMM 152 then wires the new web widget to all widgets consuming the resource (step 550). To identify compatible widgets for wiring, the WMM 152 may compare semantic tags of the resource produced by the new web widget with semantic tags of the resource consumed by a candidate web widget.

However, if the resource produced by the new web widget is not yet known to the WMM 152 (step 530), then the WMM 152 updates the res_prod_cons array to include the resource. To this end, the WMM 152 creates two empty sets: a first set representing web widgets producing the resource and a second set representing web widgets consuming the resource (step 532). The WMM 152 then updates the first set with the new web widget (step 534). The WMM 152 then determines which of the other web widgets in the web mashup 148 consume the resource (step 536). If the WMM 152 identifies one or more web widgets that consume the resource, the WMM 152 updates the second set with the one or more web widgets and wires each of the one or more web widgets to the new web widget (step 536).

If the web widget itself consumes one or more resources (step 560), then the WMM 152 determines whether the consumed resource is known to the WMM 152 for the web mashup 148 (step 565). To this end, the WMM 152 may determine whether the res_prod_cons array includes the consumed resource. If the consumed resource is not yet known to the WMM 152, the method 500 proceeds to the step 568, where the WMM 152 adds the consumed resource to the Widget_reqs array (which is described above) and stores an indication that a requirement of the new web widget— namely, the consumed resource—is not yet satisfied.

However, if the consumed resource is known to the WMM 152 (step 565), the WMM 152 updates the res_prod_cons array to include the new web widget as a consumer of the resource (step 570). The WMM 152 then wires the new web widget to all widgets producing the resource (step 580). To identify compatible widgets for wiring, the WMM 152 may compare semantic tags of the resource consumed by the new web widget with semantic tags of the resource produced by a candidate web widget. After the step 580 or the step 568, the method 500 proceeds to step 590, where the WMM 152 may then identify and resolve cycles among the widgets, which is further described below in conjunction with FIG. 7. After the step 590, the method 500 terminates.

Figure 6:
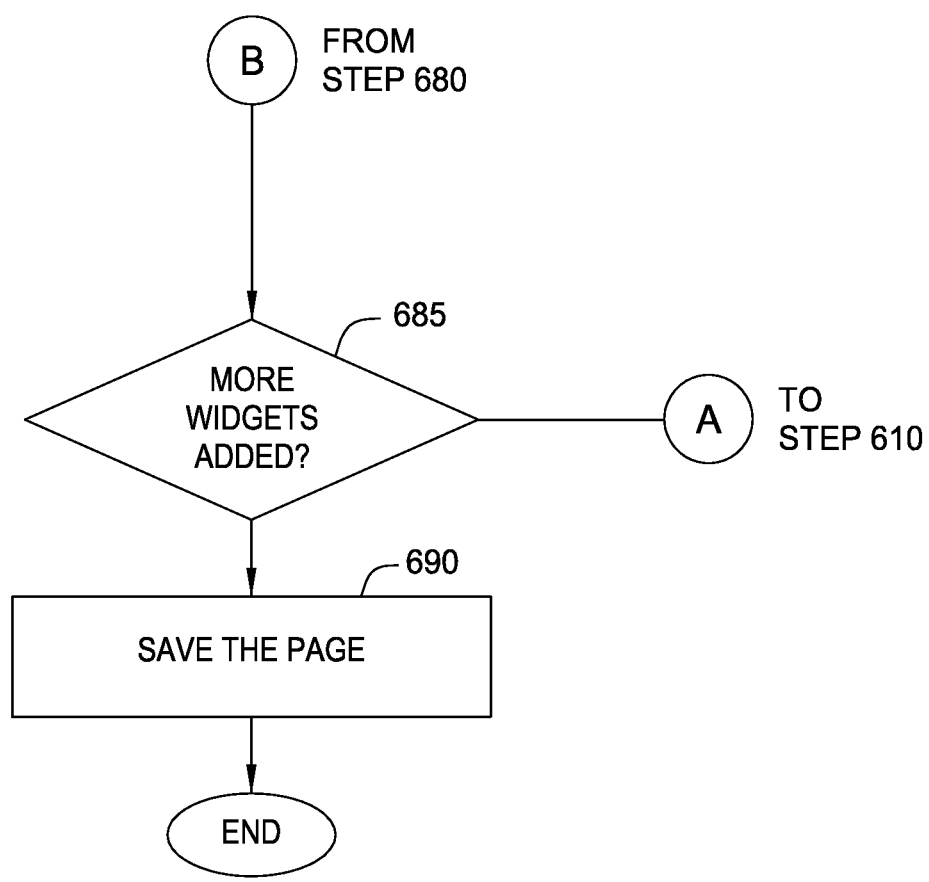
FIG. 6 is a flowchart depicting a method 600 for generating the web mashup by repeatedly adding web widgets to the web mashup, according to one embodiment of the invention.

FIG. 6 is a flowchart depicting a method 600 for generating the web mashup 148 by repeatedly adding web widgets to the web mashup 148, according to one embodiment of the invention. As shown, the method 600 begins at step 610, where the WMM 152 waits for a web widget to be added to the web mashup 148. At step 620, in response to the web widget being added to the web mashup 148, the web widget publishes information to the WMM 152. At step 630, the WMM 152 registers the information of the web widget in at least the Web_description object (which is described above). At step 640, the WMM 152 sets the web widget as being active and stores an indication that the WMM 152 has not yet checked for the existence of cycles involving the web widget. For example, the WMM 152 sets the cycle_id variable to FALSE and the availability variable to TRUE.

At step 650, the WMM 152 stores indications of resources consumed and/or produced by the web widget. For example, the WMM 152 updates the Widget_prods, Widget_reqs, and Widget_depends arrays accordingly. At step 660, the WMM 152 stores indications of semantic tags associated with the web widget. For example the WMM 152 updates the Widget_tag and tag_Widget arrays accordingly. At step 670, the WMM 152 wires the web widget with other web widgets in the web mashup 148 based on resources produced/consumed by the respective web widgets and using the semantic tags associated with the respective web widgets. At step 680, the WMM 152 identifies and resolves any cycles among the web widgets, which is further described below in conjunction with FIG. 7. If the user adds another web widget is added to the web mashup 148 (step 685), the WMM 152 returns to the step 610 to process another web widget. Otherwise, the WMM 152 saves the web mashup 148 (step 690). After the step 690, the method 600 terminates.

Figure 7:
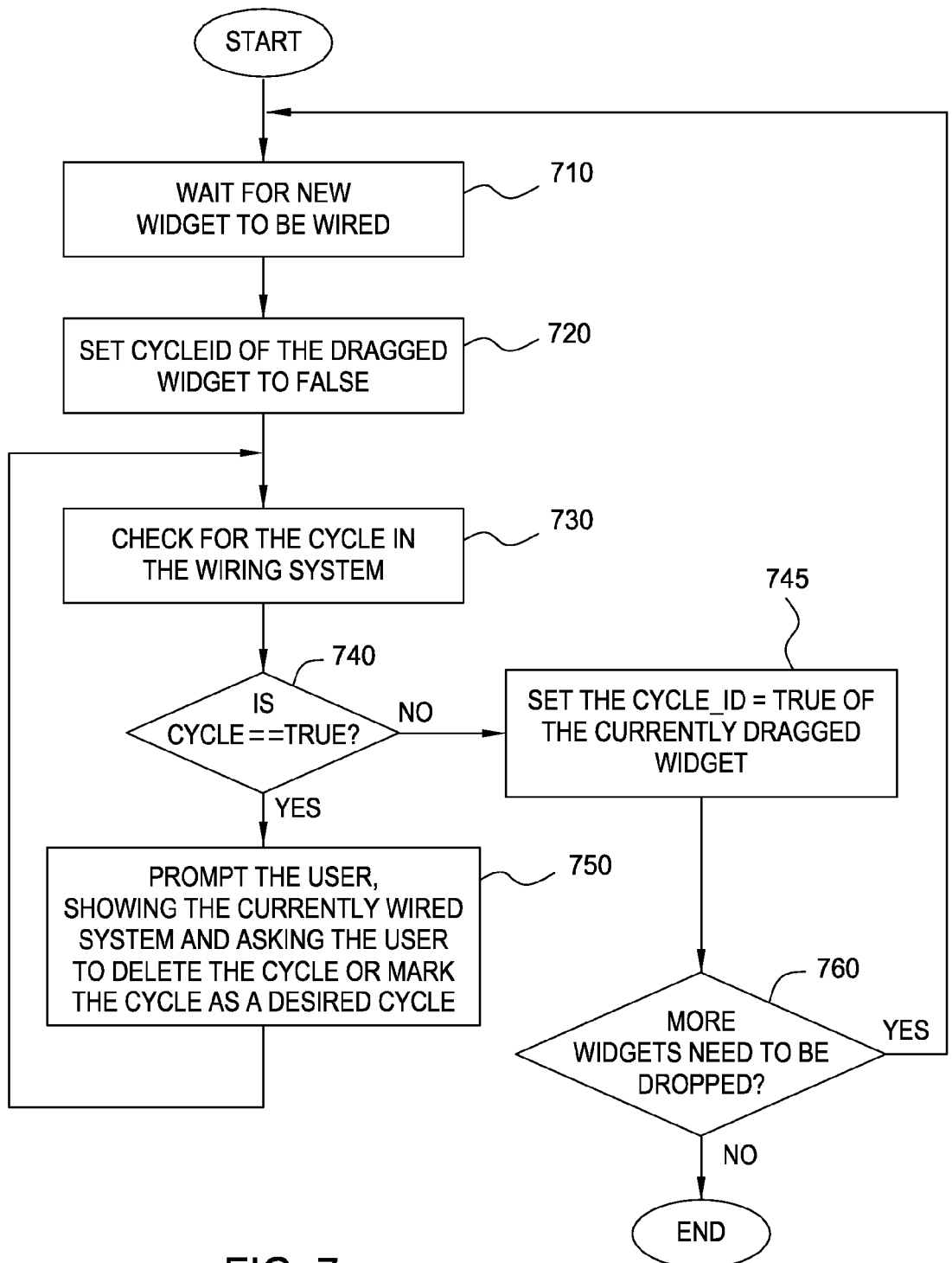
FIG. 7 is a flowchart depicting a method for detecting and removing cycles among the web widgets of the web mashup, according to one embodiment of the invention.

FIG. 7 is a flowchart depicting a method 700 for detecting and removing cycles among web widgets of a web mashup 148, according to one embodiment of the invention. As shown, the method 700 begins at step 710, where the WMM 152 waits for a new web widget to be added and wired to other web widgets. At step 720, the WMM 152 stores an indication that the WMM 152 has not yet checked for the existence of cycles involving the new web widget. For example, the WMM 152 sets the cycle_id flag of the new web widget to FALSE. At step 730, the WMM 152 checks for a cycle in the wiring in the web mashup 148.

If a cycle is identified (step 740), the WMM 152 prompts the user to delete the cycle or to mark the cycle as a desired cycle. The WMM 152 then returns to the step 730 to identify another cycle. If the user specifies to delete the cycle, the WMM 152 deletes at least one of the wirings in the cycle and/or at least one web widget from the web mashup 148. The WMM 152 may also prompt the user to select which of the wirings to delete. If the user marks the cycle as the desired cycle, the WMM 152 allows the cycle to remain in the web mashup 148. Alternatively, the WMM 152 may determine whether a cycle is a desired cycle without requiring user input. The WMM 152 may make this determination based on one or more predefined rules. For example, the predefined rules may specify that a cycle with no exit condition is not a desired cycle. The exit condition may include a branch to another web widget (thereby breaking out of the cycle) or an output to a user (such as writing data to a file or displaying data on a GUI). Other rules are broadly contemplated.

If the WMM 152 does not identify any further cycles (step 740), the WMM 152 stores an indication that the WMM 152 has checked for the existence of cycles involving the new web widget (step 745). For example, the WMM 152 sets the cycle_id flag of the new web widget to TRUE. If the user adds another web widget is added to the web mashup 148 (step 760), the WMM 152 returns to the step 710 to process another web widget. Otherwise, the method 700 terminates.

As described above, the WMM 152 stores information pertaining to the web widgets in the web widget registry 154. Advantageously, by storing the information in the web widget registry 154, the web widgets are no longer required to store information pertaining to the existence of other web widgets in the web mashup 148. Further, the web widgets are no longer required to determine suitable candidates for wiring. Instead, the logic for storing the information and for determining suitable candidates for wiring is encapsulated within the WMM 152. Accordingly, creation of web widgets and/or web mashups may be simplified.

FIG. 8 illustrates web widget registry entries 800 for the exemplary web widgets of Table III, according to one embodiment of the invention. As described above, the exemplary web widgets include a first web widget for uploading files, a second web widget for viewing files, and a third web widget for saving timestamps associated with files. The registry entries 800 include an entry 806 for the first web widget, an entry 802 for the second web widget, and an entry 810 for the third web widget. Each registry entry includes a corresponding plurality of fields 804, 808, 812. The fields include an identifier for the web widget, an indication of resources consumed by the web widget, an indication of resources produced by the web widget, semantic tags associated with the web widget, an identifier of a semantic ontology that includes the semantic tags, an availability flag for the web widget, a cycle flag for the web widget, and a listing of other web widgets to which the web widget is wired. Of course, those skilled in the art will recognize that the web widget registry 154 may be adapted to include other fields in other embodiments.

In one embodiment, the WMM 152 provides two distinct modes for removing web widgets from the web mashup 148. The WMM 152 removes web widgets either as part of cycle removal or in response to user input. The two distinct modes include normal removal and cascaded removal. In normal removal mode, the WMM 152 only removes web widgets that are specified to be removed (either by the user or as determined by the WMM 152). In cascaded removal mode, the WMM 152 removes web widgets that are specified to be removed, along with any web widgets that are dependent on the specified web widgets—i.e., that consume a resource provided by the specified web widgets.

Figure 9:
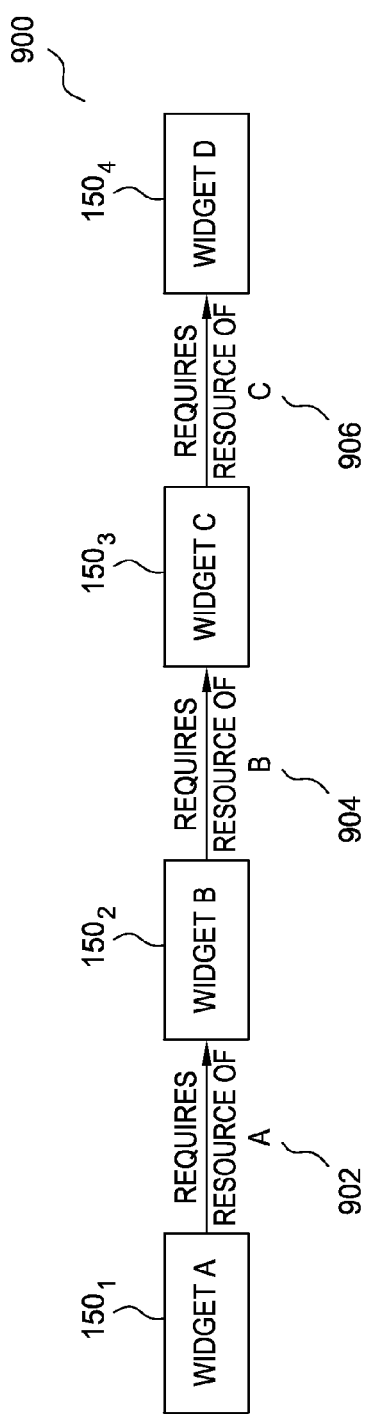
FIG. 9 illustrates a chain of dependent web widgets of the web mashup, according to one embodiment of the invention.

FIG. 9 illustrates a chain 900 of dependent web widgets 150, according to one embodiment of the invention. As shown, the web widgets include a first widget $150_1$, a second widget $150_2$ that consumes a resource produced by the first widget $150_1$, a third widget $150_3$ that consumes a resource produced by the second widget $150_2$, and a fourth widget $150_4$ that consumes a resource produced by the third widget $150_3$. The consumer-producer dependencies between the web widgets 150 are represented by arrows 902, 904, 906. Assume that the user specifies to delete the second widget $150_2$. In normal removal mode, the WMM 152 removes only the second widget $150_2$ from the web mashup 148. In cascaded removal mode, the WMM 152 removes the second widget $150_2$ along with web widgets dependent on the second widget $150_2$—namely, the third widget $150_3$ and the fourth widget $150_4$. To determine dependencies between the web widgets, the WMM 152 retrieves information stored in the Widget_depends array (described above).

Figure 10:
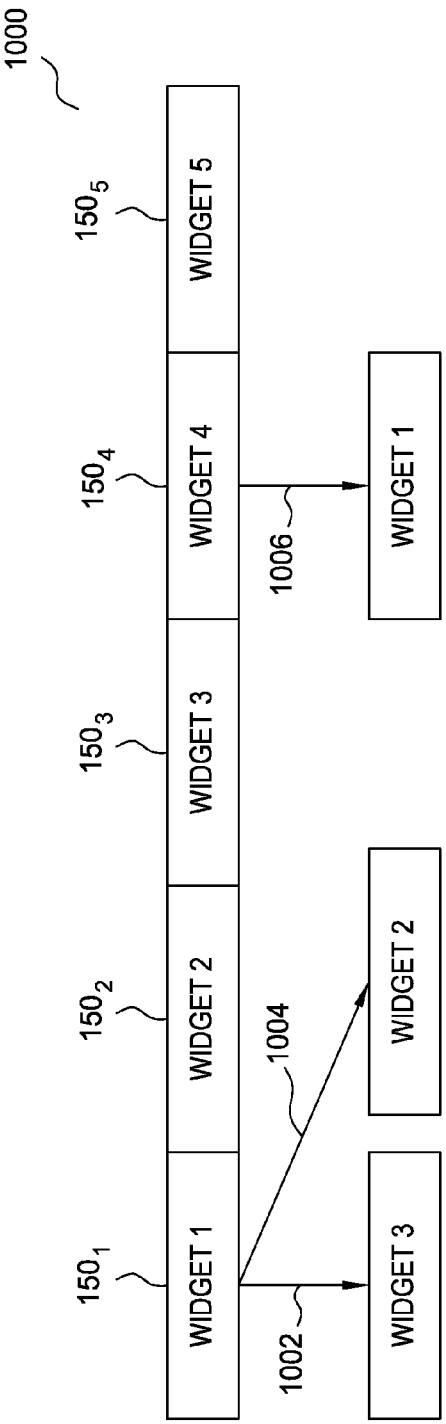
FIG. 10 illustrates a data structure storing dependencies between web widgets, according to one embodiment of the invention.

FIG. 10 illustrates a data structure 1000 storing dependencies between web widgets of the web mashup 148, according to one embodiment of the invention. The data structure 1000 corresponds to the Widget_depends array of Table VII. Assume that the web mashup 148 includes five web widgets $150_1$, $150_2$, $150_3$, $150_4$, $150_5$. As shown, the Widget_depends array includes indications that the second web widget $150_2$ and the third web widget $150_3$ both depend from the first web widget $150_1$ and that the first web widget $150_1$ depends from the fourth web widget $150_4$. The WMM 152 may use the indications to determine additional web widgets to remove in cascaded removal mode.

In one embodiment, the WMM 152 provides two distinct modes for wiring web widgets in the web mashup 148. The two distinct modes include automatic wiring and manual wiring. In automatic wiring mode, the WMM 152 wires together web widgets 150 of a web mashup 148 without requiring input from a user. In manual wiring mode, the WMM 152 wires together web widgets 150 of a web mashup 148 based on user input. The WMM 152 provides a toggle for the user to switch between the two distinct modes. Depending on the embodiment, the WMM 152 also toggles between the two distinct modes without requiring input from the user. For example, the WMM 152 may toggle between the two distinct modes based on a predefined set of parameters.

In one embodiment, the parameters may include a count of cycles formed upon adding a web widget to the web mashup 148. Alternatively or additionally, the parameters may include a count of wires formed upon adding the web widget to the web mashup 148. If either (or both) of these counts exceeds a predefined threshold, the WMM 152 switches from automatic wiring mode to manual wiring mode. The WMM 152 then notifies the user that the wiring mode has been changed. The user may review the wiring and/or make any desired changes manually via the WMM 152. The user may then save the web mashup 148, upon which the WMM 152 may revert back to automatic wiring mode. The parameters and/or thresholds may be retrieved from a configuration file associated with the WMM 152. In some embodiments, the parameters may also specify to disable either the automatic wiring mode or the manual wiring mode. Advantageously, web widgets 150 may be wired more conveniently and/or efficiently using these distinct wiring modes.

In one embodiment, the WMM 152 may store, as a preset, the wirings among a given set of widgets. Upon subsequently encountering the same set of widgets, the user may request the WMM 152 to apply the preset to the widgets. In response, the WMM 152 may wire the widgets more efficiently than if the preset was not applied. Depending on the embodiment, the preset may include at least part of the web widget registry 154 and/or may be exported as a configuration file associated with the WMM 152.

As described above, in one embodiment, the WMM 152 determines compatible web widgets 150 for wiring, based on semantic tags. The semantic tags may belong to one or more predefined ontologies. Each ontology specifies a plurality of semantic tags and the hierarchical relationships between the semantic tags. The hierarchical relationships may be used to determine whether a consumed resource is compatible with a produced resource.

Figure 11:
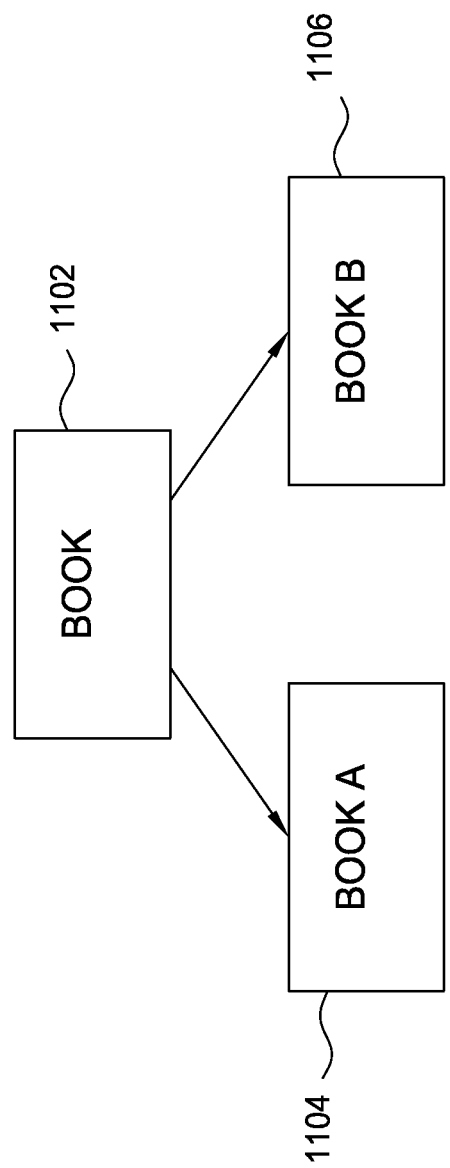
FIG. 11 illustrates an ontology of semantic tags, according to one embodiment of the invention.

FIG. 11 illustrates an exemplary ontology 1100, according to one embodiment of the invention. As shown, the ontology 1100 includes three resource types: BOOK 1102, "BOOK A" 1104, and "BOOK B" 1106. The ontology 1100 represents associations between the generalized resource BOOK 1102 and the specialized resources, BOOK A 1104 and BOOK B 1106. Assume that a first web widget consumes a resource of type BOOK 1102. Any web widget producing a semantically identical resource (i.e., BOOK 1102) is compatible with the first web widget. Further, any web widget producing a specialized resource (i.e., relative to BOOK 1102) is also compatible with the first web widget. On the other hand, assuming that the first web widget instead consumes a resource of type BOOK A 1104, then only web widgets producing a resource of type BOOK A 1104 is compatible with the first web widget. Accordingly, by using semantic tags of an ontology, the WMM 152 may wire web widgets 150 more accurately and/or efficiently.

Figure 12:
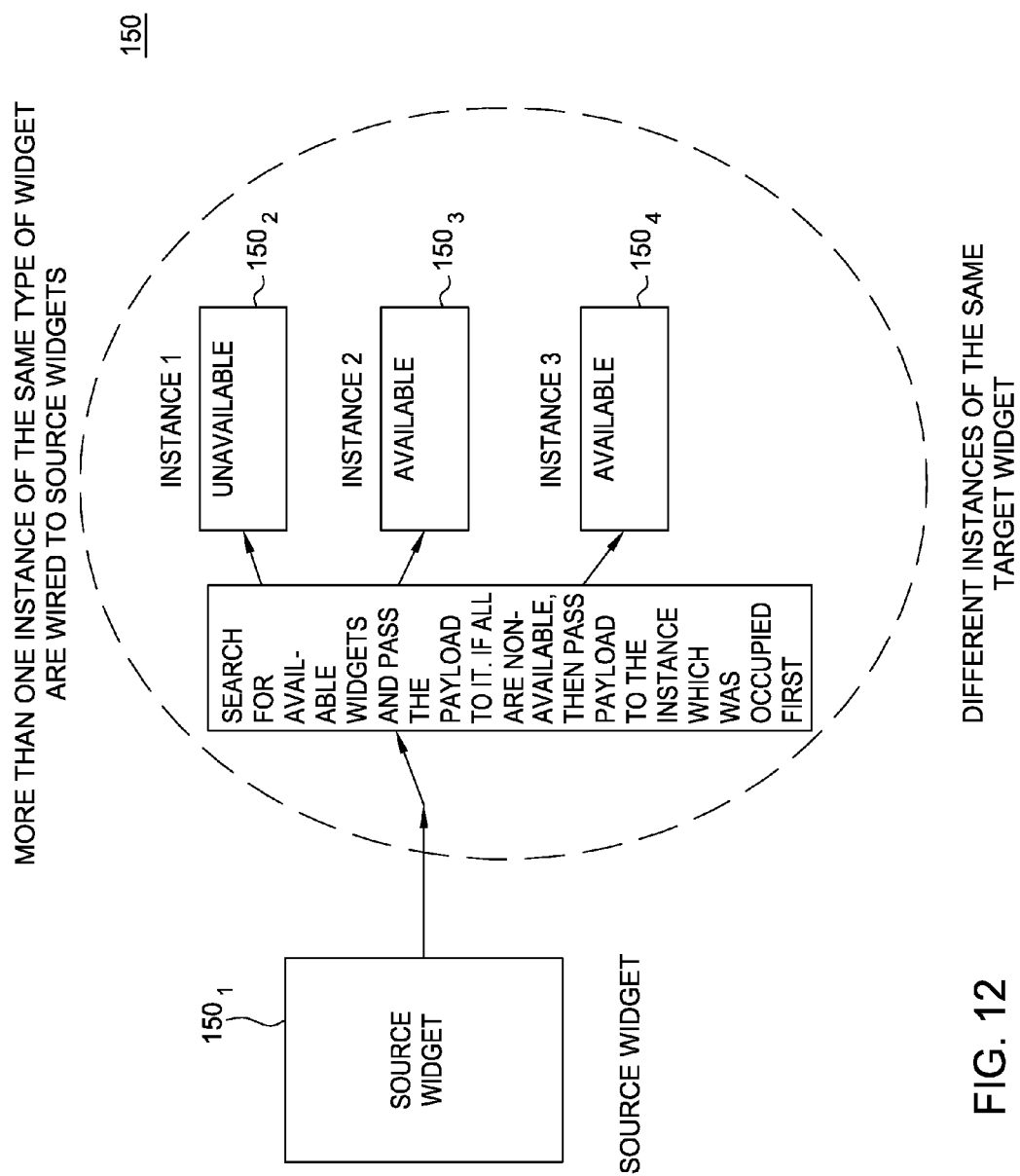
FIG. 12 illustrates a web mashup in which multiple widget instances of the same type are wired to a given web widget, according to one embodiment of the invention.

FIG. 12 illustrates a web mashup 148 in which multiple widget instances of the same type are wired to a given web widget, according to one embodiment of the invention. As shown, a first type of web widget produces a resource that is consumed by multiple instances of a second type of web widget. The WMM 152 identifies the first and second types of web widgets (e.g., using the Widget_depends and resc_prod_cons objects, which are described above). The WMM 152 also monitors how many of the second type of web widget is available or unavailable. Upon receiving a resource produced by the first type of web widget, if all instances of the second type of web widget are available, the WMM 152 sends the resource to one or more of the instances of the second type of web widget. If only some of the instances of the second type of web widget are available, the WMM 152 sends the resource to one or more of the available instances. If none of the instances of the second type of web widget are available, the WMM 152 sends the resource to the instance which was first set as unavailable (i.e., relative to the other instances).

FIG. 13 illustrates a web mashup in which multiple web widget for uploading files are wired to a single web widget for viewing uploaded files, according to one embodiment of the invention. In one embodiment, the WMM 152 monitors communications between the web widgets $150_1$, $150_2$ for uploading files and the web widget $150_3$ for viewing uploaded files. Using the techniques described in conjunction with FIG. 12, the WMM 152 may also allow each of the web widgets $150_1$, $150_2$ to send resources to multiple instances of the web widget $150_3$.

Of course, those skilled in the art will recognize that one or more graphical user interface (GUI) screens of the web widgets and/or web mashup may be provided by technologies such as Hypertext Markup Language (HTML), Extensible Hypertext Markup Language (XHTML), Cascading Style Sheets (CSS), JavaScript, and Asynchronous JavaScript and XML (Ajax). As described above, each web service adheres to one or more predefined web service protocols. The web service protocols may include XMLHTTPRequest (XHR), XML-RPC, JavaScript Object Notation RPC (JSON-RPC), Simple Object Access Protocol (SOAP), and Representational State Transfer (REST). Further still, to send, store, and/or receive data, the web widgets and/or the WMM may use technologies such as JSON, XML, and Keyhole Markup Language (KML).

Advantageously, embodiments of the invention provide techniques for wiring web widgets of a web mashup. One embodiment of the invention provides a widget manager module (WMM). The WMM generates a web widget registry based on one or more properties of web widgets of a web mashup. Based on the web widget registry, the WMM wires the web widgets together without requiring any input from a user. The WMM also detects and removes cycles among the web widgets and provides an interface for the web widgets to communicate with one another. The WMM also allows the user to manually specify to include or exclude one or more wirings between the web widgets. Advantageously, web widgets may be wired together more accurately and/or efficiently. Accordingly, a user may create web mashups more conveniently and/or efficiently.

While the foregoing is directed to embodiments of the present invention, other and further embodiments of the invention may be devised without departing from the basic scope thereof, and the scope thereof is determined by the claims that follow.

What is claimed is:

1. A computer-implemented method to facilitate mashup web application development, based on a web widget registry, the computer-implemented method comprising:

selecting a plurality of web widgets based on user input and for inclusion in a mashup web application to be accessed by a first computer, wherein each of the plurality of web widgets comprises an embeddable web application that retrieves data from a respective computer other than the first computer, wherein each web widget is uniquely identifiable via a widget identifier;

accessing the web widget registry, which specifies: (i) dependencies between the plurality of web widgets; (ii) a mapping between web widgets and semantic tags; and (iii) for each of a plurality of distinct resource types, a producer list of web widgets producing the respective resource type, and a consumer list of web widgets consuming the respective resource type;

programmatically wiring the plurality of web widgets by operation of one or more computer processors, based on a plurality of matches and without requiring any user input explicitly specifying which of the plurality of web widgets to wire together, thereby facilitating development of the mashup web application, wherein the plurality of matches includes at least three of: (i) a matching resource type; (ii) a matching semantic tag; (iii) a matching class; and (iv) a match between a producer and a consumer of the matching resource type; and upon determining that a cycle is present in the programmatically wired plurality of web widgets, resolving the determined cycle and storing an indication that the cycle is resolved.

2. The computer-implemented method of claim 1, wherein the plurality of widgets is wired by a widget manager module of the mashup web application, wherein the widget manager module is configured to, in generating the web widget registry, independently store each individual widget attribute selected from: (i) a description of a respective web widget; (ii) a resource produced by a respective web widget; (iii) a resource consumed by a respective web widget; and (iv) semantic tags associated with a respective web widget.

3. The computer-implemented method of claim 2, wherein the semantic tags are selected from a predefined ontology of semantic tags, wherein the ontology of semantic tags is used for determining compatible resources, and wherein wiring the plurality of web widgets comprises:

wiring a first web widget and a second web widget based on the web widget registry and the ontology of semantic tags.

4. The computer-implemented method of claim 3, wherein wiring the plurality of web widgets comprises:

creating a plurality of wirings, wherein each wiring connects: (i) a respective first web widget producing a resource and (ii) a respective second web widget consuming a compatible resource, as determined based on the ontology of semantic tags.

5. A computer program product to facilitate mashup web application development, based on a web widget registry, the computer program product comprising a computer-readable memory including hardware and having computer-readable program code embodied therewith, the computer-readable program code executable to:

select, based on user input, a plurality of web widgets for inclusion in a mashup web application to be accessed by a first computer, wherein each of the plurality of web widgets comprises an embeddable web application that retrieves data from a respective computer other than the first computer, wherein each web widget is uniquely identifiable via a widget identifier;

access the web widget registry, which specifies: (i) dependencies between the plurality of web widgets; (ii) a mapping between web widgets and semantic tags; and (iii) for each of a plurality of distinct resource types, a producer list of web widgets producing the respective resource type, and a consumer list of web widgets consuming the respective resource type;

programmatically wire the plurality of web widgets by operation of one or more computer processors when executing the computer-readable program code, based on a plurality of matches and without requiring any user input explicitly specifying which of the plurality of web widgets to wire together, thereby facilitating development of the mashup web application, wherein the plurality of matches includes at least three of: (i) a matching resource type; (ii) a matching semantic tag; (iii) a matching class; and (iv) a match between a producer and a consumer of the matching resource type; and upon determining that a cycle is present in the programmatically wired plurality of web widgets, resolve the determined cycle and store an indication that the cycle is resolved.

6. The computer program product of claim 5, wherein the plurality of widgets is wired by a widget manager module of the mashup web application, wherein the widget manager module is configured to, in generating the web widget registry, independently store each individual widget attribute selected from: (i) a description of a respective web widget; (ii) a resource produced by a respective web widget; (iii) a resource consumed by a respective web widget; and (iv) semantic tags associated with a respective web widget.

7. The computer program product of claim 6, wherein the semantic tags are selected from a predefined ontology of semantic tags, wherein the ontology of semantic tags is used for determining compatible resources, and wherein wiring the plurality of web widgets comprises:

wiring a first web widget and a second web widget based on the web widget registry and the ontology of semantic tags.

8. The computer program product of claim 7, wherein wiring the plurality of web widgets comprises:

creating a plurality of wirings, wherein each wiring connects: (i) a respective first web widget producing a resource and (ii) a respective second web widget consuming a compatible resource, as determined based on the ontology of semantic tags.

9. A system to facilitate mashup web application development, based on a web widget registry, the system comprising:

one or more computer processors; and a memory containing a program, which when executed by the one or more computer processors is configured to perform an operation comprising:

selecting, based on user input, a plurality of web widgets for inclusion in a mashup web application to be accessed by a first computer, wherein each of the plurality of web widgets comprises an embeddable web application that retrieves data from a respective computer other than the first computer, wherein each web widget is uniquely identifiable via a widget identifier;

accessing the web widget registry, which specifies: (i) dependencies between the plurality of web widgets; (ii) a mapping between web widgets and semantic tags; and (iii) for each of a plurality of distinct resource types, a producer list of web widgets producing the respective resource type, and a consumer list of web widgets consuming the respective resource type;

programmatically wiring the plurality of web widgets, based on a plurality of matches and without requiring any user input explicitly specifying which of the plurality of web widgets to wire together, thereby facilitating development of the mashup web application, wherein the plurality of matches includes at least three of: (i) a matching resource type; (ii) a matching semantic tag; (iii) a matching class; and (iv) a match between a producer and a consumer of the matching resource type; and upon determining that a cycle is present in the programmatically wired plurality of web widgets, resolving the determined cycle and storing an indication that the cycle is resolved.

10. The system of claim 9, wherein the plurality of widgets is wired by a widget manager module of the mashup web application, wherein the widget manager module is configured to, in generating the web widget registry, independently store each individual widget attribute selected from: (i) a description of a respective web widget; (ii) a resource produced by a respective web widget; (iii) a resource consumed by a respective web widget; and (iv) semantic tags associated with a respective web widget.

11. The system of claim 10, wherein the semantic tags are selected from a predefined ontology of semantic tags, wherein the ontology of semantic tags is used for determining compatible resources, and wherein wiring the plurality of web widgets comprises:

wiring a first web widget and a second web widget based on the web widget registry and the ontology of semantic tags.

12. The computer-implemented method of claim 11, wherein wiring the plurality of web widgets comprises:

creating a plurality of wirings, wherein each wiring connects: (i) a respective first web widget producing a resource and (ii) a respective second web widget consuming a compatible resource, as determined based on the ontology of semantic tags.

13. The system of claim 12, wherein the widget manager module is configured to independently resolve the determined cycle by each individual operation selected from: (i) in one instance, removing a wiring of the plurality of wirings without requiring any user input specifying to remove the wiring, thereby removing the determined cycle; (ii) in another instance, removing the wiring upon receiving user input specifying to remove the determined cycle, thereby removing the determined cycle; and (iii) in still another instance, upon receiving user input specifying not to remove the determined cycle, designating the determined cycle as a desired cycle, wherein the desired cycle is not removed.

14. The system of claim 13, wherein the widget manager module is configured to programmatically wire the plurality of web widgets without requiring any user input explicitly specifying how to wire the plurality of web widgets, and such that web widgets are matched for wiring based on one or more matching production and consumption needs and based further on one or more matching semantic tags, wherein the widget manager module is configured to determine the one or more matching production and consumption needs and the one or more matching semantic tags, based on the web widget registry.

15. The system of claim 14, wherein removing one of the plurality of wirings comprises removing a web widget and at least one other web widget that depends on the removed web widget, as a cascaded effect of removing the web widget;

wherein wiring the plurality of web widgets further comprises:

determining that a predefined threshold is exceeded, wherein the predefined threshold comprises a user-configurable value; and upon determining that the predefined threshold is exceeded, prompting for user input explicitly modifying the plurality of wirings.

16. The system of claim 15, wherein the widget manager module is configured to independently determine that each individual threshold is exceeded, selected from: (i) a count of the plurality of web widgets; (ii) a count of the plurality of wirings; and (iii) a count of cycles determined to be present in the plurality of wirings; wherein each count is distinct in value.

17. The system of claim 16, wherein the widget manager module is further configured to, in generating the web widget registry, independently store each individual widget attribute selected from: (i) a widget identifier uniquely identifying a respective web widget; (ii) a semantic web identifier associated with a respective web widget; and (iii) an availability indicator characterizing a respective web widget; wherein the web widget registry is updated to store wirings between the plurality of widgets.

18. The system of claim 17, wherein at least one widget of the selected plurality of widgets is configured to publish one or more widget attributes of the at least one widget to the widget manager module, prior to the web widget registry being generated.

19. The system of claim 18, wherein the widget manager module is configured to programmatically wire the plurality of web widgets so as to satisfy each production need and each consumption need in the plurality of web widgets, wherein the plurality of web widgets include: (i) a first widget to upload one or more desired files and (ii) a second widget to output the uploaded one or more desired files for display.

20. The system of claim 19, wherein the widget manager module is represented as a widget manager module object, wherein each web widget publishes information in a widget publication object and to the widget manager module for inclusion in the web widget registry, wherein the widget publication object includes:

(i) a widget description including at least a widget name and a widget identifier.

21. The system of claim 20, wherein the widget publication object further includes:

(ii) a resource-production-consumption object specifying, for each resource, a first set of web widgets producing the respective resource and a second set of web widgets consuming the respective resource.

22. The system of claim 21, wherein the widget publication object further includes:

(iii) a widget consumption object specifying resources consumed by the respective web widget;

(iv) a widget production object specifying resources produced by the respective web widget.

23. The system of claim 22, wherein the widget publication object further includes:
- (v) one or more semantic tags pertaining to the respective web widget;
- (vi) the indication, wherein the indication comprises a cycle flag specifying whether cycles have been resolved for the respective web widget, wherein each cycle is a directed cycle.

24. The system of claim 23, wherein the widget publication object further includes:
- (vii) a availability flag specifying whether the respective web widget is set to active; and
- (viii) a hierarchy identifier specifying an ontology associated with the respective web widget.

\* \* \* \* \*